United States Patent [19]

Yoshiga et al.

[11] 4,247,663

[45] Jan. 27, 1981

[54] HEAT SHRINKABLE POLYVINYL CHLORIDE FILM WITH METHYL METHACRYLATE POLYMER ADDITIVE

[75] Inventors: Norio Yoshiga; Hiroshi Nakamura; Mototaka Ohmura, all of Nagahama, Japan

[73] Assignee: Mitsubishi Plastics Industries Limited, Tokyo, Japan

[21] Appl. No.: 11,997

[22] Filed: Feb. 14, 1979

[30] Foreign Application Priority Data

Mar. 14, 1978 [JP] Japan ................................ 53-29147
Mar. 14, 1978 [JP] Japan ................................ 53-29148

[51] Int. Cl.$^3$ ........................ C08L 33/10; C08L 33/8; C08L 33/12
[52] U.S. Cl. ........................................ 525/227; 156/85; 206/432; 206/497; 264/288.4; 264/290.2; 264/DIG. 71; 428/910
[58] Field of Search ..................... 264/288.4, 290.2; 428/36, 500, 910; 525/227

[56] References Cited

U.S. PATENT DOCUMENTS

| | | | |
|---|---|---|---|
| 3,254,146 | 5/1966 | Quinn | 264/210 |
| 3,570,051 | 3/1971 | Zygan | 264/289 |
| 3,957,917 | 5/1976 | Kitaguchi | 260/884 |
| 3,969,469 | 7/1976 | Love | 260/89 |
| 4,003,963 | 1/1977 | Creasy | 260/897 |
| 4,113,681 | 9/1978 | Harmuth | 260/28.5 |
| 4,115,479 | 9/1978 | Daidone | 260/884 |

*Primary Examiner*—C. A. Henderson
*Attorney, Agent, or Firm*—Oblon, Fisher, Spivak, McClelland & Maier

[57] ABSTRACT

A heat shrinkable polyvinyl chloride film which shrinks more than 60% in one direction or more than 75% as an area shrinkage is prepared by stretching a film comprising 5 to 25 wt. parts of a methyl methacrylate type copolymer and 100 wt. parts of polyvinyl chloride at a special high stretch ratio.

9 Claims, No Drawings

HEAT SHRINKABLE POLYVINYL CHLORIDE FILM WITH METHYL METHACRYLATE POLYMER ADDITIVE

BACKGROUND OF THE INVENTION

1. Field of the Invention

The present invention relates to a heat shrinkable polyvinyl chloride film. More particularly, it relates to a heat shrinkable polyvinyl chloride film which is suitable for a contact-packaging of a complicate shaped product such as a bottle, a cup, a vessel and other products.

2. Description of the Prior Arts

Recently, it has been required to use highly heat shrinkable films for contact-packagings depending upon developments of large size containers and irregular shaped products.

In order to attain a contact-packaging of a large size product having complicated shape such as a large bottle for carbonated beverage having a thin neck and a large body and a cup of cup noodles, it is necessary to obtain a highly heat shrinkable film. The known heat shrinkable polyvinyl chloride film has not enough high shrinkage. When the film is stretched at high stretch ratio, a tearing or a whitening of a film is caused in the stretching operation and a practically valuable film could not be obtained in such high stretching operation.

SUMMARY OF THE INVENTION

It is an object of the present invention to provide a highly heat shrinkable polyvinyl chloride film which is suitable for a contact-packaging of an article having a complicated shape such as a bottle, a cup for cup noodles and other products having a complicated shape.

It is another object of the present invention to provide a highly heat shrinkable film which has high shrinkage and high tensile strength.

The foregoing and other objects of the present invention have been attained by providing a highly heat shrinkable polyvinyl film which shrinks more than 60% in one direction or more than 75% as an area shrinkage by forming a film comprising 5 to 25 wt. parts of a methyl methacrylate type copolymer and 100 wt. parts of polyvinyl chloride and stretching it at special high stretch ratio.

DETAILED DESCRIPTION OF THE PREFERRED EMBODIMENTS

When a uniaxially heat shrinkable film is prepared, the film comprising 5 to 25 wt. parts of a methyl methacrylate type copolymer and 100 wt. parts of polyvinyl chloride is stretched at a stretch ratio of 3.5 to 6 times in one direction and at a stretch ratio of less than 1.5 times in the perpendicular direction.

When a biaxially heat shrinkable film is prepared, the film is stretched at a total of stretch ratios in longitudinal direction and in transversal direction, of 5 to 7.5 times and each stretch ratio of more than 1.5 times.

Suitable polyvinyl chloride and used in the present invention include homopolymers of vinyl chloride and copolymers of vinyl chloride and less than 20 wt. % of a comonomer which have an average polymerization degree of more than 700.

The comonomers can be known monomers which can be easily copolymerized with vinyl chloride.

Suitable methyl methacrylate type copolymers include copolymers having 60 to 85 wt. % of a methyl methacrylate component and 40 to 15 wt. % of a $C_1$–$C_4$ alkyl acrylate component.

When the carbon atoms of the alkyl group in the alkyl acrylate component are increased, a dispersive power of the copolymer in the polyvinyl chloride is inferior and accordingly, a $C_1$–$C_4$ alkyl group is preferable.

When a content of the alkyl acrylate component is higher than 40 wt. %, the effect of the addition of the copolymer is not suitable and the optical property of the film is adversely affected. When a content of the alkyl acrylate component is less than 15 wt. %, the effect of the addition of the copolymer is not satisfactory and a fabricatability of the film is deteriorated. It is preferable to incorporate 15 to 40 wt. % of a $C_1$–$C_4$ alkyl acrylate component.

A content of the methyl methacrylate type copolymer is preferably in a range of 5 to 25 wt. parts especially 10 to 20 wt. parts to 100 wt. parts of polyvinyl chloride.

When the content of the methyl methacrylate type copolymer is less than 5 wt. parts, the improved effect for stretching is not expected and a tearing or a whitening of the film is caused in the stretching operation. When it is more than 25 wt. parts, the effect for stretching is inferior and the effect of the addition is inferior. Therefore, it is preferable in a range of 5 to 25 wt. parts.

It is possible to incorporate suitable additives such as a lubricant, a thermal stabilizer, an antielectrostatic agent, an ultraviolet absorber and a plasticizer in the composition for the film.

The highly heat shrinkable polyvinyl chloride film of the present invention can be prepared by melt-extruding the composition through a desired conventional die and stretching at said special stretch ratio in one direction or two directions by the conventional stretching method By way of example, the film may be stretched in a stretching zone at 60° to 100° C.

In the preparation of a uniaxially stretched film the stretch ratio is preferably in a range of 3.5 to 6 times. When it is less than 3.5 times, the shrinkages is less than 60% and it is difficult to use the film to attain a contact-package of a large size bottle so as to cover from body to neck. On the contrary, when it is greater than 6 times, a tearing or a whitening of the film is caused in the stretching operation and a practically valuable film is not obtained.

The resulting heat shrinkable polyvinyl chloride film has high shrinkage and has excellent optical characteristics and can be used for packaging a large size bottle, a large size container or an irregular shaped container by the contact-packaging to provide excellent appearance in a heat shrunk packaging.

It is preferable to give the shrinkage of more than 65% in one direction which may be attained by stretching the specific film at a stretch ratio of more than 4.0 times in one direction.

When it is required to give a slight heat shrinkability to the other direction of the polyvinyl chloride film for the purpose of a prevention of a sag, it is possible to stretch in the perpendicular direction at a stretch ratio of less than 1.5 times especially about 1.05 to 1.2 times to form a special biaxially stretched film having a shrinkage of 5 to 20%. When a stretch ratio is greater than 1.5 times, the following biaxially stretched film is prepared.

In the preparation of a biaxially stretched film, a total of a stretch ratio in one direction and a stretch ratio in the perpendicular direction is preferably in a range of 5 to 7.5 times.

When it is less than 5, an area shrinkage is less than 75% and a contact-packaging for an irregular shaped container is not satisfactorily attained. On the contrary, when it is greater than 7.5, a tearing and a whitening of the film is caused in the stretching operation and a practically valuable film is not obtained.

In order to attain suitable contact-packaging on all surface of an irregular shaped container, it is necessary to stretch biaxially at a stretch ratio of greater than 1.5 times in each direction. When a stretch ratio is less than 1.5 times in either direction, a shrinkage in one direction is short. When an irregular shaped container such as a cup is packed by the contact-packaging in the heat-shrinking packaging, an non-contacted part of the film is partially remained as a lip or creases. Accordingly, the stretch ratio is greatly than 1.5 times in both directions to prepare the biaxially stretched film.

It is preferable to give the area shrinkage of more than 80% which may be attained by stretching the specific film at a total of stretch ratios of more than about 6.0.

The resulting highly heat shrinkable polyvinyl chloride film has high shrinkage and excellent optical characteristics and it can be used for a heat shrinking package for a complicate shaped container, a large container or a bottle in excellent appearance because of a contact-packaging.

The highly heat shrinkable polyvinyl chloride film having a shrinkage of more than 60% in one direction can be used for a contact-packaging with sleeve. The film is bonded to form a cylindrical film which has high shrinkage in diameter and an article is covered with the cylindrical film and then the film is heated to shrink in diameter. This is suitable for forming a label on a body of a bottle having a neck. The bonding of the film in the cylindrical film can be made with a binder or a heat cut of overlapping part of the film.

The high heat shrinkable polyvinyl chloride film having a shrinkage of more than 75% of an area shrinkage can be used for a contact-packaging in seal. The film is bonded in all of opening sides to seal an article in the film. The bonding of the film can be made by a heat cut of overlapping part of the film. The film is heated to shrink in biaxial direction. This is suitable for packaging various article in tight without excess space.

The present invention will be further illustrated by certain examples and references which are provided for purposes of illustration only and are not intended to be limiting the present invention.

In the examples, the measurements were carried out by the following methods.

(i) Shrinkage:

Each line having a length of 100 mm was written at a center in longitudinal direction (take-up direction) and in transversal direction (perpendicular direction) on each square sample having each length of 120 mm.

Each sample was heated in a glycerin bath at 100° C. for 5 minutes and each length of the line was measured as l(mm) and each shrinkage was calculated by the equation:

$$\text{shrinkage (\%)} = \frac{100 - l}{100} \times 100.$$

(ii) Area shrinkage:

Each line having a length of 100 mm was written at a center in longitudinal direction (take-up direction) and in transversal direction (perpendicular direction) on each square sample having each length of 120 mm.

Each sample was heated in a glycerin bath at 100° C. for 5 minutes and each length of the line in longitudinal direction was measured as $l^{MD}$ (mm) each length of the line in transversal direction was measured as $l^{TD}$ (mm) and each area shrinkage was culculated by the equation:

$$\text{area shrinkage} = \frac{100 \times 100 - l^{MD} \times l^{TD}}{100 \times 100} \times 100.$$

(iii) Haze:

Haze was measured by Japanese Industrial Standard K-6718.

(iv) Glossiness:

Glossiness was measured by Japanese Industrial Standard Z-8741.

EXAMPLE 1

100 Wt. parts of homopolymer of vinyl chloride having an average polymerization degree of 800 and a density of 1.38 g/cm$^3$ was admixed with 4 wt. parts of dibutyl tin maleate, 0.7 wt. part a lubricant and 15 wt. parts of a plasticizer and then, 14 wt. parts of a methyl methacrylate copolymer comprising 76 wt. % of methyl methacrylate component and 24 wt. % of butyl acrylate was blended. The mixture was melt-extruded to form a sheet and each sheet was stretched in a tenter having a preheating zone at 95° C. and a stretching zone at 85° C. at a stretch ratio of 3.5 to 6.0 times in transversal direction as a uniaxial stretching to obtain films having a thickness of 40μ.

Shrinkages, optical characteristics and stretching properties of the sample films are shown in Table 1.

Reference 1

The sheet obtained in the process of Example 1 was stretched at a stretch ratio of 3.2 times or 7.0 times in transversal direction to obtain a film having a thickness of 40μ.

Shrinkages, optical characteristics and stretching properties of the sample films are also shown in Table 1.

Reference 2

The homopolymer of vinyl chloride and the additives of Example 1 were admixed without blending the methyl methacrylate copolymer.

The mixture was melt-extruded to form a sheet and each sheet was stretched in transversal direction at a stretch ratio of 3.5 to 4.5 times under the conditions of Example 1 to obtain films having a thickness of 40μ.

Shrinkages, optical characteristics and stretching properties of the sample films are shown in Table 1.

Table 1

|  | Stretch ratio in trans. (times) | Shrinkage in trans. (%) | Optical Haze (%) | Glossiness (%) | Stretching property |
|---|---|---|---|---|---|
| Example 1 | 3.5 | 63 | 0.8 | 187 | good |
|  | 4.0 | 66 | 0.8 | 188 | " |
|  | 4.5 | 67 | 1.0 | 186 | " |
|  | 5.0 | 69 | 1.0 | 183 | " |
|  | 6.0 | 71 | 1.8 | 178 | " |
| Reference 1 | 3.2 | 57 | 0.7 | 187 | good |
|  | 7.0 | 72 | 3.8 | 170 | whitening |
| Reference 2 | 3.5 | 64 | 4.8 | 166 | whitening |
|  | 4.0 | 66 | 11.3 | 143 | " |

Table 1-continued

| Stretch ratio in trans. (times) | Shrinkage in trans. (%) | Optical Haze (%) | Glossiness (%) | Stretching property |
|---|---|---|---|---|
| 4.5 | — | — | — | tearing |

Table 1 shows the following facts.

As shown in Reference 1, when the stretch ratio is less than 3.5 times, a stretching operation can be smoothly performed, but the shrinkage is lower than 60%. On the contrary, when it is greater than 6.0, a whitening or a tearing of the film is caused in the stretching operation.

As shown in Reference 2, when the methyl methacrylate copolymer is not incorporated, a whitening or a tearing of the film is caused at relatively low stretch ratio in the stretching operation.

As shown in Example 1, when the sheet comprising 14 wt. parts of the methyl methacrylate copolymer is stretched at a stretch ratio of 3.5 to 6.0 times, the stretching operation is smoothly performed and films having a shrinkage of higher than 60% and excellent optical characteristics as low haze and high gloss degree can be obtained.

EXAMPLE 2

100 Wt. parts of homopolymer of vinyl chloride having an average polymerization degree of 800, a density of 1.38 g/cm³ was admixed with 4 wt. parts of dibutyl tin maleate, 0.7 wt. part of a lubricant, and 10 to 18 wt. parts of a plasticizer and then, 5 to 25 wt. parts of a methyl methacrylate copolymer comprising 84 wt. % of methyl methacrylate component and 14 wt. % of butyl acrylate component was blended. Each mixture was melt-extruded to form a sheet and each sheet was stretched in a tenter having a preheating zone at 95° C. and a stretching zone at 85° C. at a stretch ratio of 3.5 to 6.0 times in transversal direction as a uniaxial stretching.

Shrinkages and stretching properties of the sample films are shown in Table 2.

Reference 3

The sheet obtained in the process of Example 2 was stretched at a stretch ratio of 3.0 times or 7.0 times in transversal direction, and shrinkages and stretching properties of the sample films were also measured. The results are shown in Table 2.

Table 2 shows the following facts.

When the stretch ratio is less than 3.5 times, a stretching operation can be smoothly performed, but the shrinkage is lower than 60%. On the contrary, when it is greater than 6.0, a tearing of the film is caused in the stretching operation.

As Example 2, the stretch ratio is preferably in a range of 3.5 to 6.0 times.

EXAMPLE 3

The sheet obtained in the process of Example 2 was stretched at a stretch ratio of 3.5 to 4.5 times by a uniaxial stretching operation and stretching properties and shrinkages were measured. The results are shown in Table 3.

Reference 4

In accordance with the process of Example 2 or Example 3 except removing the methyl methacrylate copolymer or incorporating 30 wt. parts of the methyl methacrylate copolymer, sheets were prepared and stretched under the same condition and stretching properties and shrinkages were measured. The results are shown in Table 3.

Table 3

| Stretch ratio (times) | Amount of copolymer (wt. parts) | Example 3 | | | | | Reference 4 | |
|---|---|---|---|---|---|---|---|---|
| | | 5 | 10 | 15 | 20 | 25 | 0 | 30 |
| 3.5 | Stretch | good | good | good | good | good | white | tear |
| | Shrink. (%) | 63 | 63 | 63 | 63 | 62 | 64 | — |
| 4.0 | Stretch | good | good | good | good | good | white | — |
| | Shrink. (%) | 66 | 66 | 66 | 66 | 66 | 66 | — |
| 4.5 | Stretch | good | good | good | good | tear | tear | — |
| | Shrink. (%) | 67 | 67 | 67 | 67 | — | — | — |

Table 3 shows the following facts.

When the methyl methacrylate copolymer is not incorporated or is incorporated in an amount of more than 25 wt. parts, a whitening or a tearing is caused even though a stretch ratio is relatively low. It is preferable to incorporate 5 to 25 wt. parts of the methyl methacrylate copolymer.

Table 2

| Amount of copolymer (wt.parts) | Stretch ratio (times) | Example 2 | | | | | Reference 3 | |
|---|---|---|---|---|---|---|---|---|
| | | 3.5 | 4.0 | 4.5 | 5.0 | 6.0 | 3.0 | 7.0 |
| 5 | Stretch | good | good | good | tear | — | good | tear |
| | Shrink.(%) | 63 | 66 | 67 | — | — | 55 | — |
| 10 | Stretch | good | good | good | good | white | good | tear |
| | Shrink.(%) | 63 | 66 | 67 | 69 | 70 | 55 | — |
| 15 | Stretch | good | good | good | good | good | good | tear |
| | Shrink.(%) | 63 | 66 | 67 | 69 | 71 | 54 | — |
| 20 | Stretch | good | good | good | tear | — | good | tear |
| | Shrink.(%) | 63 | 66 | 67 | — | — | 54 | — |
| 25 | Stretch | good | good | tear | — | — | good | tear |
| | Shrink.(%) | 62 | 66 | — | — | — | 54 | — |

Note
stretch: stretching property
shrink: shrinkage
tear: tearing
white: whitening

EXAMPLE 4

Each sheet obtained in the process of Example 1 was stretched in a longitudinal stretching machine having preheating rolls at 50° C., stretching rolls at 70° C. and cooling rolls at 40° C. at a stretch ratio of 2.0 to 3.0 times in longitudinal direction and then, it was stretched in a tenter having a preheating zone at 95° C. and a stretching zone at 85° C. at a stretch ratio of 2.0 to 5.0 times in transversal direction and at a total of the stretch ratio in longitudinal direction and the stretch ratio in transversal direction of 5 to 7.5 times to obtain films having a thickness of 40μ.

Area shrinkages and optical characteristics of the sample films were measured. The results are shown in Table 4.

Reference 5

The sheet obtained in the process of Example 1 was stretched under substantially same condition except at a total of the stretch ratio in longitudinal direction and the stretch ratio in transversal direction is 4.5 or 8.0 to obtain films having a thickness of 40μ.

Area shrinkage and optical characteristics of the sample films were measured. The results are shown in Table 4.

Reference 6

The homopolymer of vinyl chloride and the additives of Example 1 were admixed without blending the methyl methacrylate copolymer.

The mixture was melt-extruded to form a sheet and each sheet was stretched at a stretched ratio of 2.0 to 2.5 times in longitudinal direction and further stretched at a stretched ratio of 2.5 to 4.0 times in transversal direction and at a total of the stretch ratios of 5.0 to 6.0 times under the condition of Example 4 to obtain films having a thickness of 40μ.

Area shrinking coefficients and optical characteristics of the sample films were measured. The results are shown in Table 4.

Table 4 shows the following facts.

As shown in Reference 5, when a total of the stretch ratios is less than 5 times, a stretching operation can be smoothly performed but the area shrinkage is less than 75%. On the contrary, when it is greater than 7.5, a whitening or a tearing of the film is caused in the stretching operation.

As shown in Reference 6, when the methyl methacrylate copolymer is not incorporated, a whitening or a tearing of the film is caused at relatively low stretch ratio in the stretching operation.

As shown in Example 4, when the sheet comprising 14 wt. parts of the methyl methacrylate copolymer is stretched at a total of the stretch ratios of 5 to 7.5 times, the stretching operation is smoothly performed and films having an area shrinkage of higher than 75 wt. % and excellent optical characteristics as low haze and high gloss degree can be obtained.

EXAMPLE 5

Each sheet obtained in the process of Example 2 was stretched in a longitudinal stretching machine having preheating rolls at 50° C. stretching rolls at 70° C. and cooling rolls at 40° C. and then, it was stretched in a tenter having a preheating zone at 95° C. and a stretching zone at 85° C. at a total of stretch ratios in longitudinal direction and in transversal direction of 5 to 7.5 and stretching properties and area shrinkage coefficients were measured. The results are shown in Table 5.

Reference 7

In accordance with the process of Example 5 except varying a total of stretch ratios to 4.5 or 8.0, the film were prepared and tested. The results are shown in Table 5.

Table 4

|  | Stretch ratio | | | Area | Optical characteristic | | |
|---|---|---|---|---|---|---|---|
|  | Long. | Trans. | Total | Shrink. | Haze(%) | Gloss(%) | Stretch |
| Example 4 | 2.0 | 3.0 | 5.0 | 76 | 0.8 | 188 | good |
|  | 2.5 | 2.5 | 5.0 | 77 | 0.9 | 185 | good |
|  | 3.0 | 3.0 | 6.0 | 84 | 0.9 | 184 | good |
|  | 2.0 | 5.0 | 7.0 | 81 | 1.3 | 188 | good |
|  | 3.0 | 4.0 | 7.0 | 86 | 2.4 | 167 | good |
|  | 3.0 | 4.5 | 7.5 | 88 | 2.6 | 160 | good |
| Reference 5 | 2.0 | 2.5 | 4.5 | 73 | 0.9 | 185 | good |
|  | 3.0 | 5.0 | 8.0 | — | — | — | tear |
| Reference 6 | 2.5 | 2.5 | 5.0 | 77 | 3.8 | 165 | white |
|  | 2.5 | 3.0 | 5.5 | 80 | 4.2 | 164 | white |
|  | 2.0 | 4.0 | 6.0 | — | — | — | tear |

Note:
Long.: longitudinal
Trans.: transversal
Area Shrink.: Area shrinkage coefficient Table 5

| Amount of copolymer (wt.parts) | Total stretch ratio (times) | Example 5 | | | | Reference 7 | |
|---|---|---|---|---|---|---|---|
|  |  | 5.0 | 6.0 | 7.0 | 7.5 | 4.5 | 8.0 |
| 5 | Stretch | good | good | good | tear | good | tear |
|  | Shrink.(%) | 78 | 81 | 83 | — | 74 | — |
| 10 | Stretch | good | good | good | good | good | tear |
|  | Shrink.(%) | 77 | 81 | 83 | 86 | 73 | — |
| 15 | Stretch | good | good | good | good | good | tear |
|  | Shrink.(%) | 77 | 80 | 83 | 86 | 73 | — |
| 20 | Stretch | good | good | good | tear | good | tear |
|  | Srhrink.(%) | 77 | 80 | 83 | — | 73 | — |
| 25 | Stretch | good | good | tear | tear | good | tear |
|  | Shrink.(%) | 77 | 80 | — | — | 73 | — |

Table 5 shows the following facts. When the total of the stretch ratios is less than 5 times, a stretching operation can be smoothly performed, but the area shrinkage is lower than 75%. On the contrary, when it is greater than 7.5 times a tearing of the film is caused in the stretching operation.

As Example 5, the total of the stretch ratios is preferably in a range of 5 to 7.5 times.

EXAMPLE 6

The sheet obtained in the process of Example 2 was stretched at a total of the stretch ratios in longitudinal direction and in transversal direction of 5 times and stretching properties and area shrinkage were measured. The results are shown in Table 6.

Reference 8

In accordance with the process of Example 5 and Example 6 except removing the methyl methacrylate copolymer or incorporating 30 wt. parts of the methyl methacrylate copolymer, sheets were prepared and stretched under the condition of Example 6 and stretching properties and area shrinkages were measured. The results are shown in Table 6.

Table 6

|  | Amount of copolymer (wt.parts) | Total of stretch ratio 5.0(times) | |
|---|---|---|---|
|  |  | Stretch | Area shrink(%) |
| Example 6 | 5 | good | 78 |
|  | 10 | good | 77 |
|  | 15 | good | 77 |
|  | 20 | good | 77 |
|  | 25 | good | 77 |
| Reference 8 | 0 | tear | — |
|  | 30 | tear | — |

Table 6 shows the following facts. When the methyl methacrylate copolymer is not incorporated or is incorporated in an amount of 30 wt. %, a whitening or a tearing is caused even though a total of the stretch ratios is 5 times. It is preferable to incorporate 5 to 25 wt. parts of the methyl methacrylate copolymer.

What is claimed is:

1. A highly heat shrinkable polyvinyl chloride film which shrinks more than 60% in one direction prepared by uniaxially stretching a film comprising 5 to 25 wt. parts of a methyl methacrylate copolymer comprising 60 to 85 weight percent of methyl methacrylate component and 100 parts of polyvinyl chloride, wherein said film has been stretched at a stretch ratio of 3.5 to 6 times in one direction and at a stretch ratio of less than 1.5 times in the perpendicular direction.

2. A highly heat shrinkable polyvinyl chloride film according to claim 1 wherein the methyl methacrylate type copolymer is a copolymer comprising 60 to 85 wt. % of methyl methacrylate component and 40 to 15 wt. % of a $C_1$-$C_4$ alkyl acrylate component.

3. A highly heat shrinkable polyvinyl chloride film according to claim 1 wherein the methyl methacrylate type copolymer is a copolymer comprising 60 to 85 wt. % of methyl methacrylate component and 40 to 15 wt. % of butyl acrylate component.

4. A highly heat shrinkable polyvinyl chloride film according to claim 1 wherein has been stretched in a stretching zone at 60° C. to 100° C.

5. A highly heat shrinkable polyvinyl chloride film which film shrinks more than 75% as an area shrinkage prepared by biaxially stretching a film comprising 5 to 25 wt. parts of a methyl methacrylate copolymer comprising 60 to 85 weight percent of methyl methacrylate component and 100 parts of polyvinyl chloride, wherein said film has been stretched at a total of stretch ratios in logitudinal direction in and transverse direction of 5 to 7.5 times and at a stretch ratio of more than 1.5 times in each direction.

6. A film according to claim 5, which gives an area shrinkage of more than 80% attained by stretching the film at a total of stretch ratios of more than about 6.0.

7. A highly heat shrinkable polyvinyl chloride film according to claim 5, wherein the methyl methacrylate type copolymer is a copolymer comprising 60 to 85 wt. % of methyl methacrylate component and 40 to 15 wt. % of a $C_1$-$C_4$ alkyl acrylate component.

8. A highly heat shrinkable polyvinyl chloride film according to claim 5, wherein the methyl methacrylate type copolymer is a copolymer comprising 60 to 85 wt. % of methyl methacrylate component and 40 to 15 wt. % of butyl acrylate component.

9. A highly heat shrinkable polyvinyl chloride film according to claim 5 which has been stretched in a stretching zone at 60° to 100° C.

* * * * *